United States Patent [19]

Goldstein

[11] 4,202,772
[45] May 13, 1980

[54] FLUID DISTRIBUTION CELL MODULE

[75] Inventor: Arthur L. Goldstein, Weston, Mass.

[73] Assignee: Ionics, Incorporated, Watertown, Mass.

[21] Appl. No.: 821,880

[22] Filed: Aug. 4, 1977

[51] Int. Cl.² ............................................. B01D 31/00
[52] U.S. Cl. .................................... 210/232; 204/301;
    210/253; 210/321 R; 210/321 B; 210/433 M;
    210/456
[58] Field of Search .................... 204/301, 180 P, 296;
    210/22, 321 A, 321 B, 321 R, 456, 232, 433,
    253; 55/158; 422/45, 48; 165/167

[56]  References Cited
   U.S. PATENT DOCUMENTS

| | | | |
|---|---|---|---|
| 1,757,364 | 5/1930 | Heibig | 210/321 A |
| 3,216,920 | 11/1965 | Nellen | 204/301 |
| 3,223,612 | 12/1965 | Chen et al. | 204/301 |
| 3,560,377 | 2/1971 | Loeffler | 210/456 X |
| 3,674,153 | 7/1972 | Gomez et al. | 210/433 M X |
| 3,811,573 | 5/1974 | Weder | 210/321 A |

OTHER PUBLICATIONS

Vadot et al., "Simplification of Extra-Corporeal Circulation by a Combined Pump-Heat Exchanger-Dialyzer Arrangement", from vol. X, Trans. Amer. Soc. Artif. Int. Organs, 1964, pp. 121-126.

*Primary Examiner*—Frank A. Spear, Jr.
*Attorney, Agent, or Firm*—Norman E. Saliba

[57] ABSTRACT

Rotationally symmetric fluid distribution cell modules combinable to form stacks for the processing of solutions are disclosed. Each module comprises at least one membrane and/or diaphragm and/or electrode and a plate, the latter having a central aperture and a plurality of fluid distribution ports symmetrically spaced in a configuration about the aperture. Connecting fluid passages lead from at least one of the ports in the plate to the central aperture such that part or all of the fluid introduced into one of those ports will flow into the aperture. In some applications of the modules there will be a second connecting fluid passage leading from the aperture to a second port such that at least part of the fluid introduced into the aperture will flow out the second port.

Stacking the plates in combination with different types of electrodes, membranes and/or diaphragms provides a cell stack in which a large variety of fluid treatment processes may be carried out. Fluid distribution to and in the stack and among the plates is controlled by the angular orientation of the plates in the stack with respect to each other, with respect to fluid input and output streams, and with respect to internal process streams within the stack.

21 Claims, 6 Drawing Figures

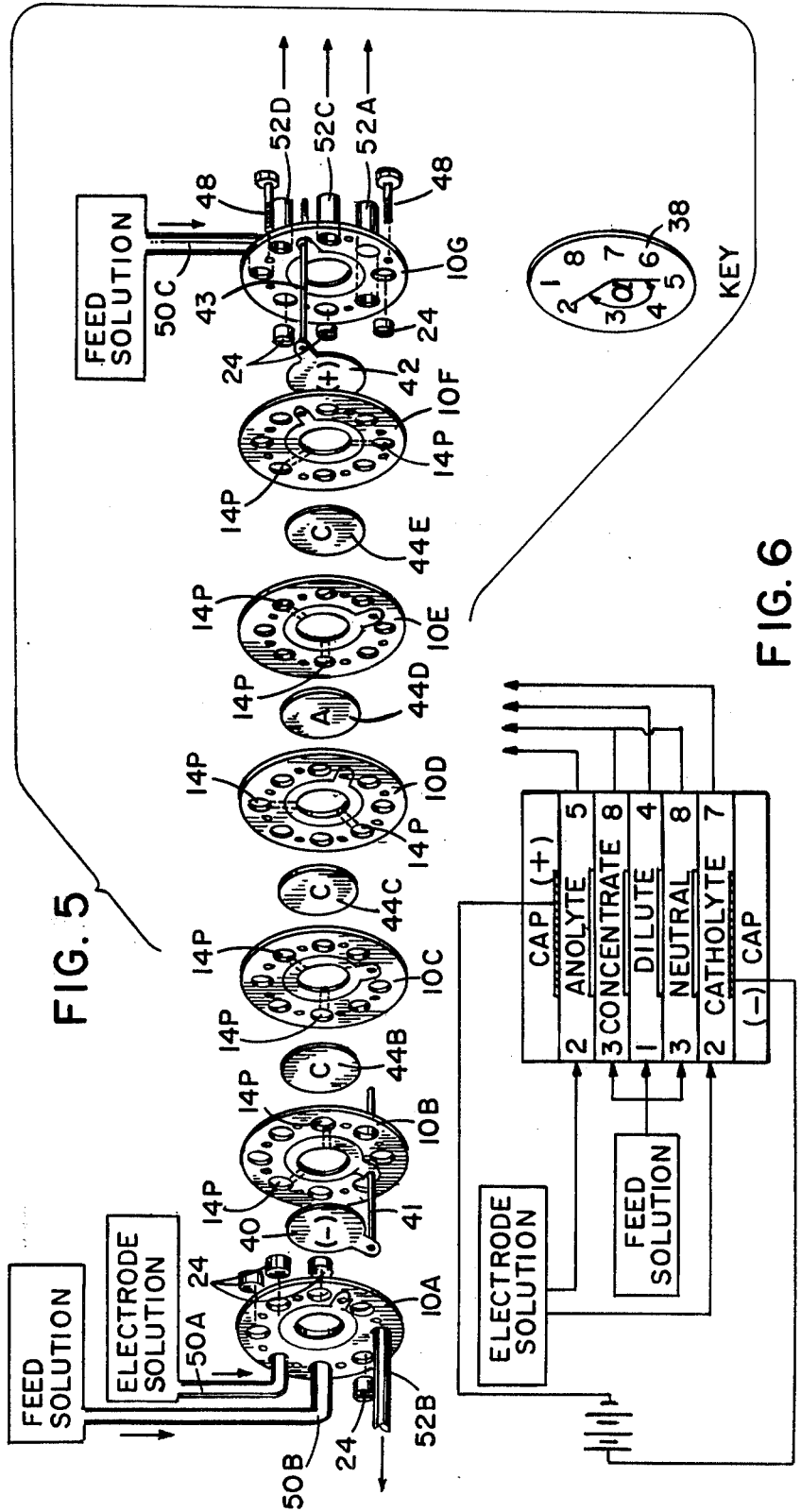

FLUID DISTRIBUTION CELL MODULE

BACKGROUND OF THE INVENTION

1. Field of the Invention:

The invention resides in the field of membrane processing devices for fluids and more particularly relates to the mechanical structure of cells used for those processes.

2. Description of the Prior Art:

Cells comprised of comparatively thin flat plates having a large central aperture and fluid distribution ports with passages leading to or by-passing the central aperture are well known in the prior art. In particular, electrodialysis stacks make extensive use of this concept. However, in prior art structures each plate or frame is of a configuration specific to the flow requirements of the cell in which it is to be used. Such frames are usually rectangular in shape and are arranged to combine with other similar frames, membranes, and electrodes to form a complete cell. In the prior art such adjacent frames are not rotationally symmetric and not interchangeable after partial rotation. A plurality of cells are stacked to form an entire processing assembly the size and number of such cell determined by the intended application of the unit.

As pointed out above, within a cell, the frames of these cells are not interchangeable with one another, each having its own unique arrangement of ports and recesses for fluid distribution, membrane containment, stack assembly and the like. Neither may such frames be positioned in any but the way in which they were designed to fit into the cell.

In contrast to the prior art, the device described herein comprises a universal cell plate analogous in function to the aforementioned frames but which may be used singly or in a stack arrangement for any of the fluid distribution and processing functions heretofore requiring specific structures each with unique configurations. As will be more fully explained, this is accomplished by arranging fluid distribution ports within the plate in a symmetrical configuration about a central aperture. Connecting passages extend from some but not all of the ports to the central aperture resulting in fluids being admitted from the ports to the area of the central aperture depending upon the orientation of the plate with respect to other plates in the stack and the input and output ports of the fluids to be processed.

SUMMARY OF THE INVENTION

The invention may be summarized as a plate shaped fluid distribution cell frame for membrane processing equipment which has a central aperture, a plurality of fluid distribution ports, and fluid passages connecting at least one of the ports to the central aperture. The ports are symmetrically spaced apart in a configuration about the aperture. The location of the connecting passages for the entrance and/or exit of fluid into and/or out of the aperture is determined by the angular or rotational orientation of the plate with respect to fluid conduits outside the aperture but within the cell. Those ports having aperture connecting passages are aligned with an input and an output fluid conduit and fluid flows through the central aperture for processing and removal thereafter.

The plates are particularly suited for use in a stack arrangement although they may be used singly. Provision may be made for aligning and joining selected ports of two or more plates. Alternatively, plugs may be used to block a particular port to prevent or direct fluid passage. Recesses may be provided adjacent to and surrounding the central aperture for the insertion of membranes, membrane supports, diaphragms and/or electrodes. Flow directing structures may be inserted within the central aperture and additional symmetrically spaced openings may be provided for receiving electrode connections and tie-rods to secure plates together to form a fluid tight stack.

A stack comprised of such plates which form the invention in combination with appropriate membranes and/or electrodes may be used to accomplish electrodialysis, electro-organic synthesis, electro-osmosis, oxidation-reduction, ion-substitution, electro-metathesis, ultra-filtration, reverse osmosis, microfiltration, electrophoresis, and other electrochemical reactions or membrane processes singly and in combination by arranging the plates in rotationally related selected sequences and orientations with regard to fluid input and output streams and electrical connections.

These and other features and aspects of the invention will be more fully understood from the drawings and description of the preferred embodiments which follow.

DESCRIPTION OF THE DRAWINGS

FIG. 5 is an expanded view showing the use of the device of FIG. 1 in a membrane processing apparatus; and FIG. 6 is a schematic representation of the device of FIG. 5.

DESCRIPTION OF A PREFERRED EMBODIMENT

Figure 1:
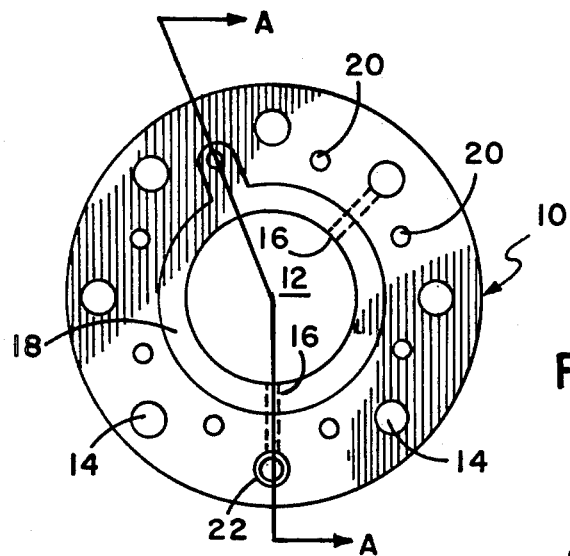
FIG. 1 is a plan view of a preferred embodiment of the invention.

Referring first to FIG. 1, there is shown a plan view of a cell module constituting a preferred embodiment of the invention. The module 10 comprises a disk shaped flat frame or plate of electrically insulating material having a central aperture 12. Eight fluid distribution ports 14 transverse the plate. Two of the ports communicate with aperture 12 through connecting fluid passages 16 and are preferably separated by at least one port there between. The ports are preferably of equal size and are symmetrically spaced apart in a confuguration such that when one module is placed atop another, the ports can be aligned in several orientations by rotation of each module with respect to adjacent modules. While the description is presented in terms of a ring configuration with equally spaced ports it will be understood that other configurations with central symmetry may be used. For example, in the case of eight fluid ports, a regular octagon would also be appropriate. The ports may be spaced in other rotationally symmetric configurations; for example, in the case of eight fluid ports the ports may be arranged in groups of two, each group equally spaced from adjacent groups.

Recess 18 may be cut into a face of the plate for receiving an electrode, a membrane, or a diaphragm. Additionally the plate may have openings 20 spaced in a symmetric configuration to provide a passage for an electrode connection or for tie-rods to secure a plurality of plates together in a stack arrangement. Optionally, tube connectors 22 arranged to press fit securely into a port of an adjoining module may be made an integral part of the assembly. Such tube connectors function positively to align the modules with respect to each other and also function to prevent leakage. Such tube connections may be used in place of or in addition to gaskets when combining plates in a stack arrangement. Each port may interchangeably have such a tube connector or a plug to block or direct fluid passage.

Figure 3:
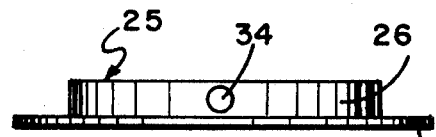
FIG. 3 is a side view of a flow distributor which may be used in conjunction with the device of FIG. 1.
Figure 2:
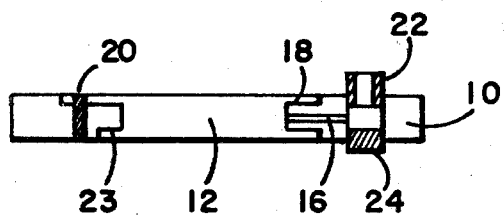
FIG. 2 is a cross-sectional view along line A—A of the device of FIG. 1.
Figure 4:
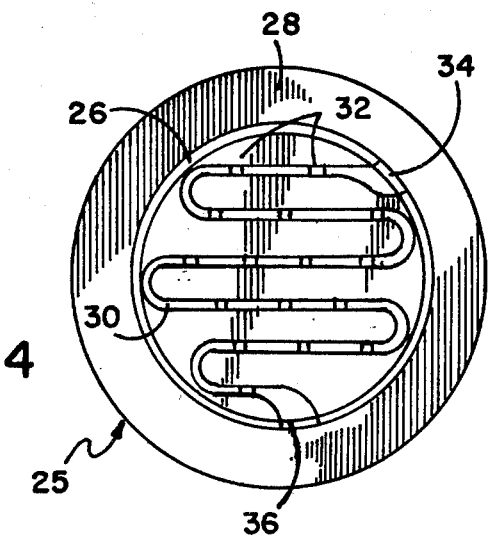
FIG. 4 is a cross-sectional plan view of the device of FIG. 3.

Referring next to FIG. 2, a cross-sectional view of the above described device is illustrated. Like numbers refer to like components. Additionally, a removable plug 24 is illustrated which may be used to prevent fluid passage through a port as for example when the module is used as an end piece in a stack. In a similar manner, tube connector 22 may be supplied as a removable part to be inserted in a port according to the selected use of the module in a stack. Also shown is an additional recess 23 preferably of the same size as recess 18 and in the opposite face of the module. The addition of a second recess allows the use of a flow directing spacer 25 in the central aperture 12 as is illustrated in FIGS. 3 and 4.

The flow directing structure 25 may be incorporated directly into the plate or maybe a hat shaped device consisting of a raised portion 26 and a lip or rim 28, the raised portion fitting into aperture 12 and the lip into recess 18 or 23 of the module. Within the raised portion may be a cut out tortuous path or band 30 optionally having cross bridges or straps 32 which act to promote turbulence of the fluid travelling between openings 34 and 36 evenly over the area of the fluid flow path to accomplish piston-like flow through the module and improved mass transport to and from the contiguous membranes, diaphragms and/or electrodes. Tortuous path spacers and turbulence promoters (straps) are fully disclosed in U.S. Pat. Nos. 2,708,658 and 2,891,899, which teachings are incorporated herein by reference. Other types of spacers such as expanded plastic material or woven screens may be alternately employed.

Referring next to FIG. 5, the use of the invention as a universal cell module in a membrane type processing apparatus is illustrated. The apparatus consists of a plurality of modules 10 of the type shown in FIGS. 1 and 2, each rotationally oriented in the stack according to its function. The stack further consists of a cathode 40 and an anode 42, a plurality of membranes 44 and, if required to obtain a liquid tight stack, a plurality of gaskets (not shown) between the various components. The entire stack may be secured by bolts 48, two of which are illustrated, which pass through openings 20 in the modules or other compression devices. The electrodes 40 and 42 are connected to an external source of power through conductors or connectors 41 and 43 which also pass through openings 20. Gaskets when employed have openings which align with module ports 14, module openings 20 and module central apertures 12.

Two end modules 10A and 10G do not act as processing chambers but are used as end caps or end plates and are arranged to receive feed lines 50 and removal lines 52 which may fit over tube connectors or nipples. When modules are used as end caps, ports which connect with the central aperture may be blocked using plugs 24 to prevent fluid passage to the central apertures. Alternatively, separate end blocks or caps having the same ports and openings as the modules but no central aperture may be employed or the end plates may be rotated to a position in which the ports communicating with the central aperture do not communicate with the external fluid flow conduits. In any case, ports which are not connected to feed or removal lines may have to be blocked using plugs 24 to prevent liquid from flowing out.

In order to illustrate the use of the stack, a key 38, not part of the apparatus, is shown for the purpose of indicating one orientation and port positioning of an eight hole plate, in this case with the smallest spacing between ports being three holes. Positions in this embodiment are designated key position numbers 1 through 8. Those ports in a plate which have fluid passages connecting to the central aperture are designated 14P. Each plate in the illustration has two, an input to the aperture and output from the aperture. Plate 10B (the cathode chamber) is oriented such that ports 14P occupy input and output key positions numbers 2 and 7; the ports of plates 10C and 10E (neutral and concentrating chambers respectively) occupy 3 and 8; the ports of 10D (the diluting chamber) occupy 1 and 4; and those of 10F (the anode chamber) positions 2 and 5.

As depicted in the key 38 illustration, the orientation of position numbers 2 and 5 is such that they form an included angle, alpha, ($\alpha$) of 135°, always less then 180°. Thus, in this plate which has eight equally spaced ports arranged in a symmetric configuration where the inlet and outlet connecting fluid passages communicate with port positions 2 and 5 respectively, the included angle formed there between would be 135°. Stated in another way, the inlet and outlet connecting fluid passages would communicate with ports (for example ports 2 and 5) that are spaced at their closest position three ports apart from each other. In such an embodiment, if the plate having the 2-5 orientation is inverted by rotation around a line passing through ports 2 and 6 while maintaining the 2 position as the pivotal point or is rotated about the central aperture so the number 5 port is in the number 2 key position, then the orientation would now become a 2-7 configuration, that is, the flow inlet still remains the number 2 port but the outlet port has now changed to the 7 position.

As a result of inversion or rotation in an eight port plate the following flow combinations are possible for fluid passages spaced three ports apart (i.e. $\alpha = 135°$) and for fluid passages spaced two ports aparts (i.e. $\alpha = 90°$) depending on the positioning and orientation of the plate:

Table 1

| Inlet Port No. | $\alpha = 135°$ Outlet Port Nos. | $\alpha = 90°$ Outlet Port Nos. |
| --- | --- | --- |
| 1 | 4 or 6 | 3 or 7 |
| 2 | 5 or 7 | 4 or 8 |
| 3 | 6 or 8 | 1 or 5 |
| 4 | 7 or 1 | 2 or 6 |
| 5 | 8 or 2 | 3 or 7 |
| 6 | 1 or 3 | 4 or 8 |
| 7 | 2 or 4 | 5 or 1 |
| 8 | 3 or 5 | 6 or 2 |

The number of flow distribution ports transversing the plate and the location of the fluid passages connecting the ports to the central aperture can be varied. The greater the number of ports in the plate then the greater the number of flow combinations that are possible.

Regardless of the number of ports it is critical that they be symmetrically spaced from each other or symmetrically spaced in groups in a configuration around the central aperture. However, it is preferred that there be at least five ports transversing the plate with from eight to eleven ports being the preferred arrangement and wherein the inlet and outlet fluid connecting passages communicate with ports that are spaced at their closest position at least two ports apart from each other.

In the broadest concept of the invention, the included angle ($\alpha$) should be greater than zero but less than 180°. However, a preferred plate configuration is determined as follows where:

n = number of flow distribution ports in the plate configuration x = the closest spacing, i.e. the smallest number of inter-port spaces, between inlet and outlet fluid connecting passages. Where x = 1, this defines an arrangement where at their closest position the inlet and outlet passages are one inter-port space away from each other, i.e. they are adjacent to each other with no port in between.

A preferred port spacing is that in which both n and x of any particular plate configuration are not simultaneously divisible by a common whole divisor other than one; i.e. n/x cannot be mathematically reduced to a simpler fraction. If n and x are not simultaneously divisible (not mathematically reducible) by a common divisor then this combination will enable any selected port in any given plate configuration to be connected through one or more intermediate plates to any port in any other plate having the same configuration as shown below. Conversely if both n and x are divisible by a common divisor then regardless of the number of intermediate plates employed it will not be possible to connect any selected port in a given plate to each and every port individually in another plate having the same configuration.

To illustrate the preferred port spacing, examples are shown below for an eight plate with three inter-port spaces between fluid connecting passages (a preferred spacing) and an eight port plate with two inter-port spaces between fluid connecting passages. (a non-preferred spacing)

In the eight port plate with a connecting passage spacing of 2, n is 8 and x is 2. Both numbers are divisible by a common factor, namely 2. The included angle $\alpha$ for this configuration is 90°. In this case it would be impossible to reach ports number 1,3,5, or 7 in any plate from ports number 2, 4,6,8 in another similar plate.

For example, stating with port 7 in the first plate the ports could connect to succeeding (intermediate) plates as follows as derived from Table 1.

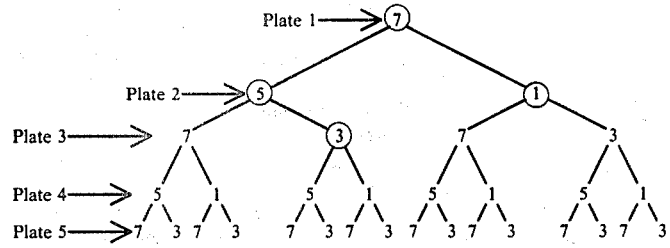

Such a system would never connect with ports 2,4,6 or 8. A similar result occurs beginning with ports 1,3 or 5 instead of port 7.

However for the same eight port plate where the connecting passage spacing is 3 instead of 2, n/x=8/3 which cannot be reduced to a simpler fraction. In this case where $\alpha$ = 135°, if a fluid was introduced into inlet port number 8, the fluid could be fed to any other numbered port as shown in Table 1 utilizing a maximum of four additional (three intermediate) plates as follows:

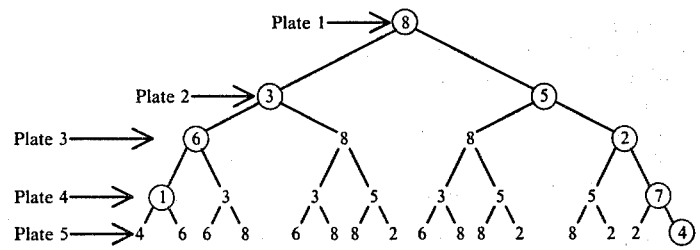

Notwithstanding the above, the most preferred (optimum) spacing or connecting passages, x, for a plate with any number of ports n, is where n/x in addition to not having said common divisor or factor also gives a result which is closest to the number 2 but is simultaneously not less than 2.

The following Table II lists preferred combinations of n and x and the resultant included angle ($\alpha$) obtainable for plate configurations having a number of ports (n) of three to twelve. As stated above, a preferred plate configuration is one which will allow any port in a plate of a given configuration to connect through one or more intermediate plates with any other port in another plate having the same configuration.

TABLE II

| n | x | Alpha° ($\alpha$°) | n/x |
|---|---|---|---|
| 3 | 1 | 120* | 3.0 |
| 4 | 1 | 90* | 4.0 |
| 5 | 1 | 72 | 5.0 |
| 5 | 2 | 144* | 2.5 |
| 6 | 1 | 60 | 6.0 |
| 7 | 1 | 51.43 | 7.0 |
| 7 | 2 | 102.86 | 3.5 |
| 7 | 3 | 154.29* | 2.33 |
| 8 | 1 | 45 | 8.0 |
| 8 | 3 | 135* | 2.66 |
| 9 | 1 | 40 | 9.0 |
| 9 | 2 | 80 | 4.5 |

TABLE II-continued

| n | x | Alpha° (α°) | n/x |
|---|---|---|---|
| 9 | 4 | 160* | 2.25 |
| 10 | 1 | 36 | 10.0 |
| 10 | 3 | 108* | 3.33 |
| 11 | 1 | 32.73 | 11.0 |
| 11 | 2 | 65.45 | 5.5 |
| 11 | 3 | 98.18 | 3.66 |
| 11 | 4 | 130.9 | 2.75 |
| 11 | 5 | 163.64* | 2.2 |
| 12 | 1 | 30 | 12.0 |
| 12 | 5 | 150* | 2.4 |

When the number (n) of ports in a plate is divided by the number of interport spaces (x) included between fluid connecting passages the result will always be two (2.0) or greater. The closer the number is to two (2.0), the closer the angle (α) is to 180°. The most preferred spacing for purpose of this invention is that spacing which gives the largest included angle for that configuration which is less than 180°. The preferred angle, α, is thus for even n>2:[180−360/n]; and for odd n:[180−180/n]. The preferred or optimum connecting passage spacing for any plate configuration with three to twelve holes is marked in the above Table II with an asterisk (*). The preference arises because where alpha (α) is small, the inlet and outlet ports are closer to each other and thus the chances of internal leakage of liquid between ports is increased. Additionally, especially where no flow directing spacer is employed in the central aperture area, the flow path of fluid entering and leaving the module is shortened allowing too little time in the central aperture area for proper processing, mass transfer, or treatment. Although in such a case the flow path length can be increased by use of a tortuous flow path spacer within the central area, such an arrangement is not entirely satisfactory since the path would generally be too tortuous and restricted in design. Thus a nine port configuration having inlet and outlet passages spaced four inter-port spaces from each other (n/x of 9/4=2.25) is preferred over a nine port configuration with a two inter-port spacing (n/x of 9/2=4.5).

The use of the stack as an electrodialysis apparatus is as follows: Membranes 44B, 44C, and 44E are cation (C) selective membranes—that is, they allow the passage of cations but retard anions. Membrane 44D is an anion (A) selective membrane which allows the passage of anions but retards cations. A feed solution is fed from a reservoir (not shown) to the stack through tubes 50 connected at positions 1 and 3 at the end plates acting as caps. An electrode solution is similarly fed from a reservois not shown through a tube 50 at position 2 at an end plate acting as a cap. Module 10A receives solution through tubes 50A and 50B at positions 2 and 3, since position 1 must be blocked, and module 10G receives solution through tube 50C at position 1, since position 2 must be blocked to prevent leakage to the central aperture.

The solution travels through all ports aligned with those positions, flowing into the central apertures when a connecting passage is present. Solution processed through the electrodialysis operation of the stack flows out of the central aperture in the same manner through effluent tubes 52 connected at positions 4,5,7 and 8. Tube 52A at position 4 removes dilute solution from plate 10D. Tube 52B, position 5, removes anolyte from plate 10F; tube 52C, position 7, removes catholyte from plate 10B; and tube 52D, position 8, removes concentrate from plate 10E. Plate 10C produces no net concentration or dilution and is also drained through tube 52D. Alternatively, this neutral solution could be removed through a tube at position 6 by reorienting plate 10C and the solution recycled if so desired.

FIG. 6 is a schematic representation of the device of FIG. 5, showing the flow arrangement in the stack. The port position designations correspond to those of the above described apparatus as indicated by the key. If desired, the various solutions may be recirculated by pumps not shown.

Examples of the operation of the invention is as follows.

Example 1 An electrodialysis stack constructed similarly to that shown in FIG. 5 was operated on a feed solution of NaCl and an electrode solution of acidified 2% $Na_2SO_4$. Silicone rubber gaskets in combination with silicone grease were used between cells to seal the stack. The membranes were those commercially available from Ionics, Incorporated, Watertown, Mass. designated 61 CZL 183 for the cation selective membrane and 103 QZL 183 for the anion selective membrane. The membranes were homogeneous in nature and constructed on a supporting or backing material of Dynel ® modacrylic cloth. The anode and cathode, constructed of platinized niobium and stainless steel respectively, were held at a cell voltage which provided a current density of 50 ma/cm². The pH of the electrode stream was approximately 2 and the pH's of the dilute and concentrated streams were adjusted to just below 7 by the addition of $H_2SO_4$. All streams were recirculated batchwise under a pressure of approximately 5 pounds per square inch.

Chloride concentrations were analyzed at intervals of 20 minutes, and over a duration of three hours were found to change from an initial concentration of 0.127 normal to a final concentration of 0.018 normal in the dilute stream and from 0.127 normal to 0.232 normal in the concentrate stream. Current efficiency varied from about 76 to 90% over the course of the three hour run.

Example 2 The apparatus was assembled in an ultrafiltration configuration, with three filtrate compartments and with the two feed compartments bounded on both sides with ultrafiltration type membranes, (a total of 4 membranes) each with 0.0123 sq. ft. effective ultrafiltration area. The feed was an aqueous solution of 0.10% sodium chloride, 0.40% lactose, and 1% bovine serum albumin (BSA). The ultrafiltration membranes were Amicon ® UM 3, approximately 0.013 cm thick. The membranes were supported by a Millipore ® stainless steel screen 4.7 cm in diameter and approximately 0.015 cm thick. A 220 ml total sample of feed solution was recirculated through the feed compartments at 140 ml/min for a period of three hours, at a transmembrane pressure of 50 psi. At the end of the test 75 ml of feed solution remained in the feed solution loop, with the balance of 145 ml having passed through the membranes into the adjacent filtrate compartments as ultrafiltrate. The concentrations in the remaining feed were analyzed at 0.103% sodium chloride, 0.54% lactose, and approximately 2.8% BSA. The ultrafiltration rate averaged:

$$\text{Ultrafiltration Rate} = \frac{(145 \text{ ml}) (24 \text{ hr/day})}{(3 \text{ hr}) (4 \text{ cells}) (0.123 \text{ ft}^2/\text{cell}) (3785 \frac{\text{ml}}{\text{gal}})} \text{ gal/day ft}^2 \text{ (GPD)} =$$

6.2 GPD

The membrane rejection R, of salt, lactose and BSA was calculated from the expression:

$$\frac{C_f}{C_i} = \left(\frac{V_i}{V_f}\right)^R; R = \frac{\ln\left(\frac{C_f}{C_i}\right)}{\ln\left(\frac{V_i}{V_f}\right)}$$

where R is the degree of rejection of solute by the membrane (At R=0 there is no rejection, and at R=1.00 there is total rejection of the solute by the membrane), C is concentration, V is volume, and the subscripts i and f denote initial and final. The $V_i/V_f$ ratio was 220 ml/75 ml=2.93. From the initial and final concentrations the following rejections were calculated:

|  | R |
|---|---|
| Sodium Chloride | 0.03 |
| Lactose | 0.28 |
| BSA | approximately 0.96 |

There was negligible rejection of sodium chloride, partial rejection of lactose, and essentially total rejection of BSA.

The configuration of FIGS. 5 and 6 comprises but one stack. A plurality of stacks of various types may be added one after another and as previously stated, any variety or combination of processes may be carried out by combining and orienting plates and stacks according to function and by inserting electrodes, membranes and diaphragms of the proper type and in the proper sequence and arrangements.

The embodiments of this invention in which are exclusive property or privilege is claimed are defined as follows:

1. A fluid distribution cell frame comprising during assembly a rotatable plate having:
   a. a central aperture transverse of said rotatable plate;
   b. more than two fluid distribution ports transverse of said rotatable plate, said ports equally spaced apart in a symmetrical configuration about said aperture;
   c. only first and second enclosed fluid connecting passages, said enclosed first fluid connecting passage communicating between one of said ports and said aperture; and said enclosed second fluid connecting passage communicating between a second of said ports and said aperture; whereby said fluid connecting passages from an included angle (alpha) which is substantially less than 180°.

2. The apparatus of claim 1 further including tube connecting members extending from some of said ports.

3. The apparatus of claim 2 further including means for blocking said ports to fluid flow.

4. The apparatus of claim 1 wherein said plate has a planar recess in one face abutting said central aperture for receiving a membrane or diaphragm.

5. The apparatus of claim 1 wherein said plate has a planar recess in one face abutting said central aperture for receiving an electrode.

6. The apparatus of claim 5 wherein said plate further has a plurality of openings transverse said plate, said openings spaced apart in a symmetrical configuration about said aperture for receiving electrical connections to said electrodes.

7. The apparatus of claim 1 wherein said fluid distribution ports constitute eight in number and said first and second fluid connecting passages communicate with ports separated from each other by two other ports.

8. The apparatus of claim 1 wherein said plate has a planar recess in both faces abutting said central opening for receiving respectively a membrane and a fluid directing spacer.

9. The apparatus of claim 1 wherein (n) the number of ports in said plate and (x) the smallest number of inter-port spaces between the said one port and the said second port are not mathematically reducible by a common whole number factor.

10. The apparatus of claim 9 wherein for any specific (n) group the optimum configuration in said group is that in which (n) divided by (x) gives a result which is the closest to the number two.

11. A multi purpose membrane processing stack for fluid treatment comprising in combination at least two substantially identical configurated cell modules in face to face relationship, each cell module comprising a rotatable plate having:
   a. a central aperture transverse of said plate;
   b. more than two fluid distribution ports transverse of said rotatable plate, said ports equally spaced apart in a symmetrical configuration about said aperture so that during assembly, rotation of said plate to any other port position with respect to an adjacent plate will allow said ports therein to remain registered and aligned with respect to the ports of said adjacent plate;
   c. an enclosed second fluid connecting passage communicating between one of said ports and said aperture;
   d. an enclosed second fluid connecting passage communicating between a second of said ports and said aperture; whereby said fluid connecting passages form an included angle (alpha) which is substantially less than 180°.
   e. a planar recess in at least one face abutting said central aperture, said stack further including at least one membrane or diaphragm within one of said planar recesses.

12. The apparatus of claim 11 wherein said stack further includes a plurality of tube connecting members extending from and communicating between liquid distribution ports in each of said cell modules.

13. The apparatus of claim 12 wherein the tube connecting members are aligned to form a fluid manifold conduit to deliver fluids to, or receive fluids from, modules within the stack.

14. The apparatus of claim 11 further including an electrode disposed at either end of said stack.

15. The apparatus of claim 11 further including a number of electrodes disposed at various locations within said stack.

16. The apparatus of claim 11 wherein said first and second fluid connecting passages communicate with ports spaced at their closest position at least two ports away from one another.

17. The apparatus of claim 11 wherein in said configuration, (n) the number of ports in said plate and (x) the smallest number of spaces between the said one port and the said second port are not mathematically reducible by a common whole number.

18. The apparatus of claim 17 wherein for any specific (n) group the optimum configuration in said group is that in which (n) divided by (x) gives a result closest to the number two.

19. The apparatus of claim 11 wherein means are provided for passing the said fluids to be treated in series or sequential flow through at least some of the said cell modules.

20. The apparatus of claim 11 wherein means are provided for passing the said fluids to be treated in parallel flow through at least some of the said cell modules.

21. The apparatus of claim 11 wherein means are provided for passing the said fluids to be treated in series flow and parallel flow, alternately and repeatedly within some of said cell modules and said stack.

* * * * *